W. Cairnes,
Cracker Machine.

No. 111,315. Patented Jan. 31, 1871.

Witnesses:
Fred. Haynes
R. F. Rabeau

Wm. Cairns.

United States Patent Office.

WILLIAM CAIRNS, OF JERSEY CITY, NEW JERSEY.

Letters Patent No. 111,315, dated January 31, 1871.

IMPROVEMENT IN CRACKER-MACHINES.

The Schedule referred to in these Letters Patent and making part of the same.

*To all whom it may concern:*

Be it known that I, WILLIAM CAIRNS, of Jersey City, in the county of Hudson and State of New Jersey, have invented certain new and useful Improvements in Cracker-Machines, of which the following is a full, clear, and exact description, reference being had to the accompanying drawing forming part of this specification, and in which—

Figure 1:
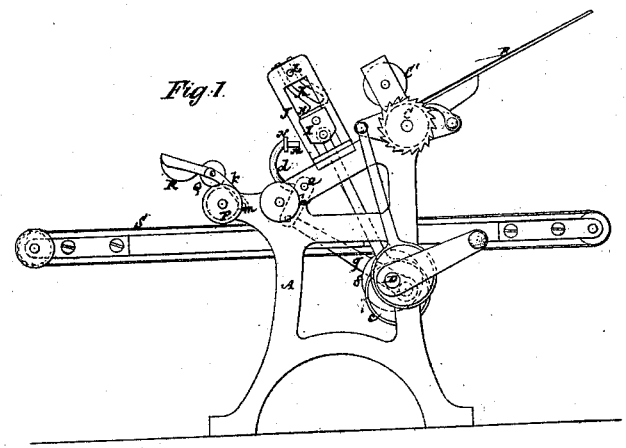
Figures 2, 4:
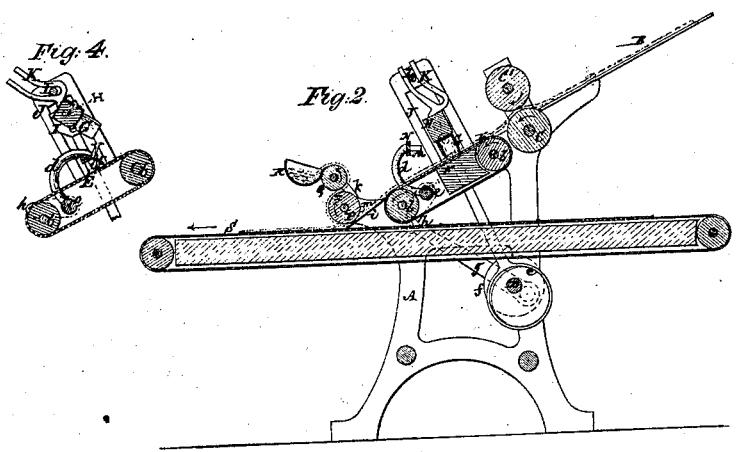

Figure 1 represents a side elevation of a cracker-making machine constructed in accordance with my invention;

Figure 2, a longitudinal vertical section of the same; and

Figure 3:
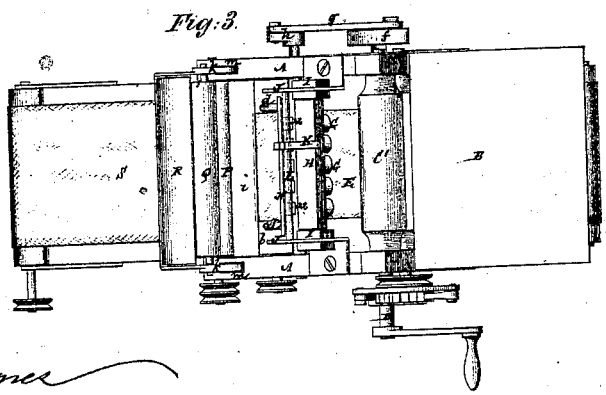

Figure 3, a plan thereof.

Figure 4 is a sectional view in illustration of the cutters and stamps in a different relative position to that shown for them in figs. 1 and 2.

Similar letters of reference indicate corresponding parts.

My invention relates to machines for making crackers from a web of dough in transit through the machine, and consists in various attachments or combinations and modes of operating certain parts or devices, whereby the cutters which press or cut out the crackers from the web and the stamps which impress the maker's name or other distinguishing mark upon them are made to operate independently of each other; also, whereby the crackers are detached from the web and the remaining portion of the web, after having had the crackers detached, is delivered into a pan arranged to receive it; likewise whereby, and through the extension of the delivery-apron in rear of the machine, the pans used to contain the crackers while baking may be automatically fed so as to catch the crackers as they are detached from the web of dough.

Referring to the accompanying drawing—

A represents the frame of the machine, which may be of any suitable construction.

B is the inclined table or board down which the web of dough is passed to the feed-rollers C C', the lower one, C, of which is driven and has its requisite intermittent travel in a forward direction, communicated to it by a ratchet motion deriving its action from a primary or driving-shaft, D.

From these rollers the dough passes on to a traveling apron, E, arranged around rollers b b, the one of which may be driven by belt from a pulley on the shaft of the operating feed-roller C, This apron passes over a cutting-block, F, on which the web of dough is first cut into crackers, and the latter subsequently stamped during each intermission of the feed.

By making the cutting operation of the crackers separate and distinct from the marking operation plain cutters may be used, and there is less liability of the dough sticking to the cutters, and a like advantage accrues to the separate stamping of the crackers.

The cutters and stamps may be variously constructed and arranged to thus operate independently of each other, but the following arrangement and operation are preferred.

G G are the cutters, arranged side by side, and attached to a block, H, which is free to turn or swivel in end slides I, that are fitted to travel up and down slotted guides J, arranged at right angles to the apron E. These slides I are moved up and down to effect the operation of the cutters G on the dough by means of eccentrics c on the driving-shaft D, or by any other suitable means.

Attached to the cutter-carrying block H is a peculiarly-shaped slotted guide, K, through which passes a fixed rod, L. The slot in this guide is of such shape that it directs the cutters G in a straight line when coming down upon or entering the dough and when leaving it, but so that, after the cutters are clear of the dough and while they perform the greater part of their up-stroke, they have a swinging action or are thrown back out of the way to make room for the stamps M to come into operation on the crackers just previously cut in the web, as represented in fig. 4. The stamps M thus operating independently of the cutters, it is also preferred to give a swinging action to make available the room temporarily afforded by the swinging action of the cutters, by attaching them, or rather the bar N which carries them, to bowed arms d, from a front cross rocking-shaft, e, that derives its movement from the driving-shaft D by an eccentric, f, rod g, and crank h.

The relative movements of the stamps and cutters are so arranged that, as the cutters ascend and are swung out of the way, as hereinbefore described, the stamps are swung forward and down on the crackers, and as the cutters descend the stamps are thrown up and back again.

The web, with the crackers thus cut and stamped in it, next passes, by or during its intermittent feed, from off the apron E, onto an inclined shelf or support, i, from whence it passes to a stripping-roller, P, that has an intermittent motion communicated to it by belt or otherwise, in direction of the arrow x, and that serves to detach the crackers by the bend or run of the web, which is thus stripped up and partly round or over said roller, and under and over a free roller or guide, Q, from whence the scrap or cut web passes into a pan, R, for future use, said pan being emptied as required from time to time by upsetting it, for which purpose it and the roller Q are carried by side or swinging arms K, hung on fulcrums, as at m.

The crackers, as cut and stamped, may be delivered, as heretofore, direct onto an endless apron, S, which, in traveling, carries off the crackers for after collection to be baked; but I prefer to extend this delivery-apron so as to project not only in front, but likewise in rear of the machine, in order that the pans in which they are required to be baked may be placed on said apron in rear of the feed-rollers or upper apron E, and, in traveling along with the apron S, be caused to catch the crackers, as the web is stripped from them, ready in their places on the pans for the oven.

What is here claimed, and desired to be secured by Letters Patent, is—

1. The combination, in a cracker-machine, of the independent cutters G and stamps M, for successive operation on the web of dough, substantially as specified.

2. The combination, with the intermittently-rotating feed-rollers C C' and intermittently-traveling apron E, of the independently-operating cutters G and stamps M, essentially as herein set forth.

3. The combination of the pivoted block H, which carries the cutters, the slides I, and guides J, by which said block is directed in its up-and-down movement and the slotted guide K, with its rod L, for effecting the swing of the cutters, essentially as shown and described.

4. The stamps M, having a swinging action, as described, in combination with the independent cutters G, arranged to have a swinging action in rear or to one side of the stamps, substantially as specified.

5. The combination of the stripping-roller P and the scrap-delivery guide or roller Q, with the endless-traveling aprons E and S, essentially as and for the purpose herein set forth.

6. The scrap-pan R, in combination with the stripping-roller P and the guide or roller Q, substantially as specified.

7. The scrap-pan R, arranged to swing or tilt as described, in combination with the roller or guide Q and the stripping-roller P, essentially as specified.

WM. CAIRNS.

Witnesses:
    FRED. HAYNES,
    R. E. RABEAU.